Jan. 19, 1932. G. CROXFORD 1,841,879

TOOL FOR USE IN PREPARING PIPE ENDS FOR JOINTING

Filed Nov. 28, 1930

Inventor:
George Croxford
By [signature]
Attorney

Patented Jan. 19, 1932

1,841,879

UNITED STATES PATENT OFFICE

GEORGE CROXFORD, OF WELLINGTON, NEW ZEALAND, ASSIGNOR TO ROYDEN NELSON, OF WELLINGTON, NEW ZEALAND

TOOL FOR USE IN PREPARING PIPE ENDS FOR JOINTING

Application filed November 28, 1930, Serial No. 498,890, and in New Zealand December 19, 1929.

This invention relates to an improved tool or device that has been designed for use in preparing pipe ends for jointing, by the formation of a ridge or burr upon the outside periphery of a copper, brass or other pipe of soft or relatively soft metal, by expanding such from the inside. The tool devised is intended specially for use by plumbers and like workmen in providing a water tap service, or like pipe connection, with a ridge or shoulder near its jointing end, with which the union nut employed in making the joint will engage when screwed on to the externally threaded socket into which the pipe end is entered, and which ridge or shoulder at the same time forms a jointing seat with the end of the socket into which it passes.

The invention provides a handy and simply worked tool that a workman may easily carry in his kit and which will form such ridge in a matter of a few moments. It may be made in various sizes to adapt it for the different sizes of pipes that require to be dealt with.

In fully describing the invention, reference will be made to the accompanying drawings illustrating it and in which:—

Figure 1:
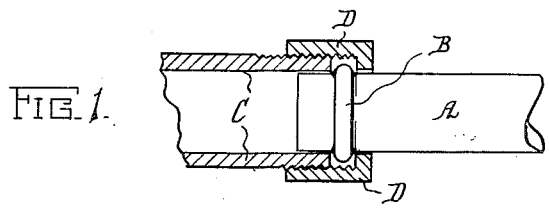
Figure 2:
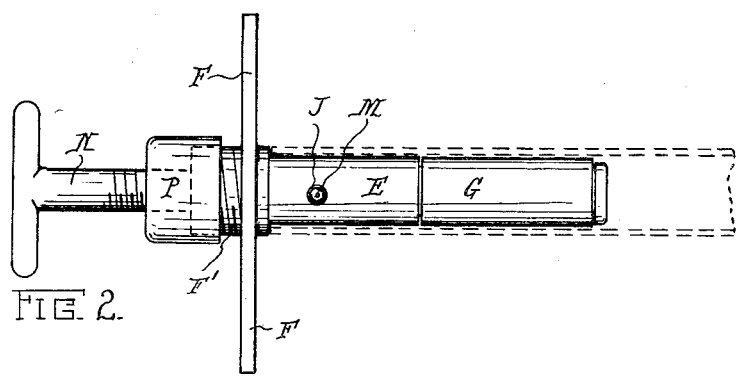
Figure 3:
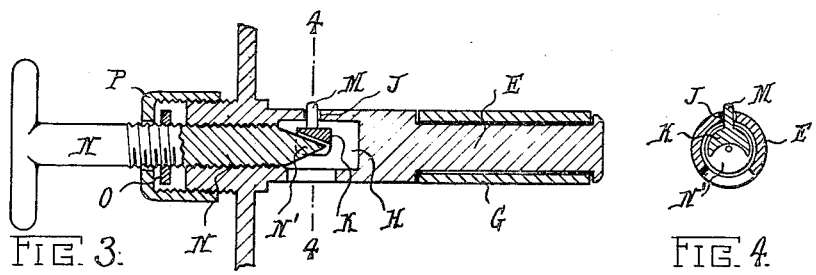
Figure 4:
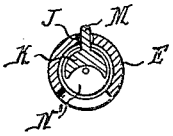
Figure 5:
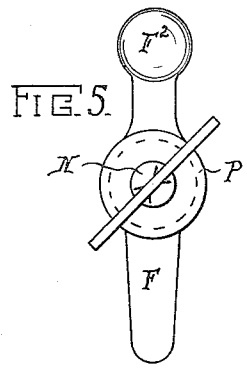
Figure 6:
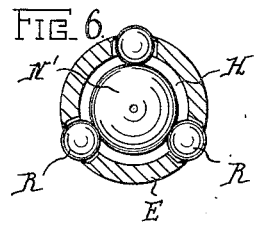

Figure 1 is a sectional elevation of the type of joint for the making of which the invention has been designed, Figure 2 is a plan of the expander, Figure 3 is a longitudinal section thereof, Figure 4 is a cross-section taken on the line 4—4 of Figure 3, Figure 5 is an end elevation of the expander, and Figure 6 is a cross-sectional view illustrating an alternative manner of giving effect to the invention.

Referring first to Figure 1, the type of joint there illustrated provides for the copper, brass, or like tube A being formed with a ridge B extending circumferentially around it, at a distance in from such end, so that when the end is inserted into the bore of the pipe C to which it is to be jointed, the ridge will seat itself upon the end of such pipe. This pipe end C is externally screwthreaded to receive an ordinary union nut D which passes over the tube A and with its flange engages the said ridge B and forces it hard upon its seat by clamping it between the pipe end C and the flange, in the well-known way. The tube A being made of copper, brass or like relatively soft metal, ensures that the ridge when formed upon the tube will make a tight seal around the end of the pipe C against which the ridge is forced.

This ridge upon the tube has hitherto been made in a number of ways but generally by expanding the tube from the inside, and the apparatus, or tool, shown in Figures 2 to 6 of the drawings, provides for the ridge being quickly and evenly made by the workman while on the job.

The said tool, or apparatus, comprises a mandrel E attached rigidly to one side of a crosshead lever F, or wheel, and which mandrel is adapted to be passed into the end of the tube A and to make a neat fit therein as indicated by the dotted lines in Figure 2, so that it may be rotated through the agency of the said crosshead or wheel. To aid its rotation in the circumstances hereinafter described, the inner end of the mandrel E may be made with a loose sleeve lining G which will be gripped in the tube by the closing of the jaws of pipe tongs upon the portion of the tube surrounding it, and thereby act in the double capacity of affording facility for the tube to be gripped without collapsing it, and affording a trunnion in which the mandrel E may be rotated.

The outer end of the mandrel E is bored longitudinally and axially with a bore extending inward for a distance inside the crosshead F. At the inner end of this bore, the mandrel is made with a cross-bore H extending diametrically which on one side of the main bore is made as a guide J for a round pin, and which bore H forms in itself a small chamber. There is fitted into this chamber a small device having a base piece K and a pin M extending from such base piece so that it is adapted to pass through the round part J of the cross-bore. The lateral movement of the device, will cause the pin M to project at its end more or less beyond the surface of the mandrel, or to be withdrawn into the mandrel. This pin has its outer end rounded. This device K—M is made of a suitable metal, preferably steel that is tempered to a hardness suitable for its purpose.

A rod N is provided to be passed in through the longitudinal bore of the mandrel E and this has its inner end so made, and the said pin device K—M has its base so made, that the inward movement of the rod N or its rotation in one direction will cause the pin M to be projected in the manner mentioned, and its outward movement, or its rotation in the reverse direction, will allow the pin to be retracted. The said projection of the pin may be effected in stages and means may be provided to prevent its projection beyond a fixed maximum distance so that any liability of cutting through a tube in the working of the tool, as hereinafter described, will be obviated.

In an approved construction, the said rod N is made to screw into the mandrel bore, and its inner end is made of cone shape N', while the base K of the pin device is made to fit onto the cone and with an inclined plane with which the cone end engages, so that the inward travel of the rod N forces the pin M out, and its outward travel leaves the pin free to be shaken or moved back by gravity. The rod N is limited in its inward and outward travel by providing it with a cross-pin O that engages the end of the mandrel when screwed in and engages a bushing nut P screwed upon a bush F' on the crosshead F through which the rod passes when screwed out. The outer end of the rod is provided with a handle for use in turning it.

Instead of the pin device K—M, there may be employed, as shown in Figure 6, a number of balls R let into the mandrel E at intervals around the chamber H and which are engaged by the cone end N' of the rod N so that they are caused to project more or less beyond the surface of the mandrel through the movements of such rod.

In operation, the mandrel E with the pin M or balls R retracted, is inserted into the tube A until the cross-head F engages the end thereof. The tube is then gripped by the pipe tongs, or other means, in the manner described, and the rod N is actuated to project the pin M or balls R slightly. The mandrel E is then rotated in the tube by using the crosshead as a handle. The projecting pin end or the balls will thereby form a slight groove on the tube inside. The pin or balls is, or are, then projected another amount, and the mandrel given a few more turns, and so on, the pin or balls being forced outward by degrees, and the mandrel turned within the tube alternately, until a groove of the desired depth, and the corresponding ridge B on the outside, has been formed.

Other ways of actuating and controlling the projection of the pin M by means passing through the outer end of the mandrel may be devised and employed without departing from the spirit of this invention.

If desired, the crosshead F may have one of its ends rounded, as shown at F² in Figure 5, to provide for any burr on the end of a pipe that may be caused when cutting it, being turned down by inserting the round head into the pipe end and turning it round therein.

I claim:—

1. A tube expanding tool, comprising a mandrel designed to be inserted into the tube end and to be rotated therein and formed with a longitudinal bore extending inward from its end and with a chamber at the inner end of such bore from which a small guide bore extends radially through to the periphery of the mandrel, a pin device disposed within such chamber with its pin extending through such radial guide bore, and means mounted in the longitudinal bore of the mandrel, engaging such pin device and designed by its operation to project the pin end to beyond the mandrel periphery, or allow it to withdraw within such periphery.

2. In a tub expander according to claim 1, a pin device formed with an inclined base, and a rod screwed through the longitudinal bore of the mandrel and formed with a cone-shaped point in its inner end which is adapted to engage the said inclined base of the pin device.

3. In a tube expander according to claim 1, the construction of the mandrel with a sleeve loosely encircling its inner end.

4. In a tube expander according to claim 1, a pin device formed with an inclined base, a rod screwed through the longitudinal bore of the mandrel and formed with a cone-shaped point in its inner end which is adapted to engage the said inclined base of the pin device, and means for controlling the longitudinal movements of the said rod, comprising a cross-pin or stop upon the projecting end of the rod and an adjustable cover nut screwed upon the outer end of the mandrel to enclose such cross-pin or stop between it and the mandrel end.

In testimony whereof, I affix my signature.

GEORGE CROXFORD.